United States Patent
Yamanaga

(10) Patent No.: US 10,120,037 B2
(45) Date of Patent: Nov. 6, 2018

(54) POWER INDUCTOR EVALUATION APPARATUS AND POWER INDUCTOR EVALUATION PROGRAM

(71) Applicant: MURATA MANUFACTURING CO., LTD., Kyoto-fu (JP)

(72) Inventor: Ko Yamanaga, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 48 days.

(21) Appl. No.: 15/009,202

(22) Filed: Jan. 28, 2016

(65) Prior Publication Data
US 2016/0223619 A1    Aug. 4, 2016

(30) Foreign Application Priority Data

Feb. 2, 2015 (JP) .................................. 2015-018740

(51) Int. Cl.
*G01R 31/40* (2014.01)
*H02M 3/04* (2006.01)
(Continued)

(52) U.S. Cl.
CPC ......... *G01R 31/40* (2013.01); *G01R 31/2848* (2013.01); *H02M 3/04* (2013.01); *G06F 17/50* (2013.01)

(58) Field of Classification Search
CPC .... G01R 31/40; G01R 31/28; G01R 31/2832; G01R 31/2836; G01R 31/2846; G01R 31/2848; H02M 3/00; H02M 3/04
See application file for complete search history.

(56) References Cited

U.S. PATENT DOCUMENTS

2008/0028342 A1* 1/2008 Tsuji .................. G06F 17/5036
                                                              716/111
2008/0191677 A1* 8/2008 Bacchi ................. H02M 3/156
                                                              323/282
(Continued)

FOREIGN PATENT DOCUMENTS

CN          104092314 A      10/2014

OTHER PUBLICATIONS

Wikipedia Buck Converter, captured using Wayback Machine on the date Dec. 30, 2014, pp. 1-20.*
(Continued)

*Primary Examiner* — Huy Q Phan
*Assistant Examiner* — David Frederiksen
(74) *Attorney, Agent, or Firm* — Studebaker & Brackett PC

(57) ABSTRACT

A power inductor evaluation apparatus includes a storage unit and a determination unit. The storage unit stores the simulation model of a DC-DC converter. The simulation model includes the equivalent circuit model of a power inductor, including a DC superimposition characteristics slope α and a saturation current Isat as parameters. The determination unit inputs the DC superimposition characteristics slope α and the saturation current Isat into the simulation model of the DC-DC converter and performs simulation, and determines whether or not the power inductor having the DC superimposition characteristics slope α and the saturation current Isat is usable on the basis of whether or not the simulation results satisfy design requirements (e.g, a permissible ripple voltage and a peak current).

11 Claims, 10 Drawing Sheets

(51) Int. Cl.
*G01R 31/28* (2006.01)
*G06F 17/50* (2006.01)

(56) References Cited

U.S. PATENT DOCUMENTS

| | | | | |
|---|---|---|---|---|
| 2009/0146635 A1* | 6/2009 | Qiu | ................. | H02M 3/156 323/290 |
| 2014/0035546 A1* | 2/2014 | James | ................. | G05F 1/618 323/282 |
| 2014/0232359 A1* | 8/2014 | Dash | ................. | H02M 3/158 323/235 |
| 2014/0285014 A1* | 9/2014 | Calhoun | ................. | H02M 3/158 307/31 |
| 2015/0015219 A1* | 1/2015 | Ishino | ................. | H02M 3/1584 323/271 |
| 2015/0035839 A1* | 2/2015 | Farenc | ................. | H02M 3/1582 345/501 |
| 2015/0097539 A1* | 4/2015 | Ragona | ................. | H02M 3/1588 323/271 |
| 2015/0311788 A1* | 10/2015 | Nandi | ................. | H02M 1/4225 323/282 |
| 2016/0070837 A1* | 3/2016 | Hidaka | ................. | G06F 17/5036 703/2 |

OTHER PUBLICATIONS

Hasaneen et al., "Design and Simulation of DC/DC Boost Converter", Power System Conference, 2008, MEPCON 2008, 12th International Middle-East, IEEE, Mar. 12, 2008, pp. 334-340.

Batard et al., "MATLAB—A Fundamental Tool for Scientific Computing and Engineering Applications—vol. 1 (Chapter 3) Simulation of Power Converters Using Matlab-Simulimk", INTECH, Sep. 26, 2012, pp. 43-68.

An Office Action issued by Chinese Patent Office dated Jun. 21, 2018, which corresponds to Chinese Patent Application No. 201610059931.8 and is related to U.S. Appl. No. 15/009,202.

* cited by examiner

POWER INDUCTOR EVALUATION APPARATUS AND POWER INDUCTOR EVALUATION PROGRAM

CROSS REFERENCE TO RELATED APPLICATIONS

This application claims benefit of priority to Japanese Patent Application 2015-018740 filed Feb. 2, 2015, the entire content of which is incorporated herein by reference.

TECHNICAL FIELD

The present invention relates to a power inductor evaluation apparatus and a power inductor evaluation program used for a DC-DC converter.

BACKGROUND

Hitherto, in electronic apparatuses, for example, IC driving voltages have decreased and circuit currents have increased, and chopper (switching) DC-DC converters having excellent conversion efficiency have been widely used. A chopper DC-DC converter, which is formed mainly of a combination of a switching device, a power inductor, a capacitor, a diode, and the like, steps down or steps up (converts) a given DC voltage to a desired DC voltage.

In designing a DC-DC converter, a circuit simulator has been utilized to verify design requirements such as ripple voltage and over-current limit. Various simulation methods for a DC-DC converter which uses a power inductor have been proposed. For example, refer to the following non-patent documents:
(1) B. M Hasaneen and Adel A. Elbaset Mohammed, "DESIGN OF SIMULATION OF DC/DC BOOST CONVERTER", Power System Conference, 2008, MEPCON 2008, 12th International Middle-East, IEEE, Mar. 12, 2008, pp. 334-340.
(2) Christophe Batard, Frederic Politiers, Christophe Millet, and Nicolas Ginot, "MATLAB-A Fundamental Tool for Scientific Computing and Engineering Applications-Volume 1 (Chapter 3) Simulation of Power Converters Using Matlab-Simulimk", INTECH, Sep. 26, 2012, PP. 43-68.

SUMMARY

Since a magnetic material is generally used in a power inductor that suppresses an AC current and smoothes a current in a DC-DC converter, the power inductor has DC superimposition characteristics (current dependency) in which the inductance changes (decreases) due to the superimposition of a DC current. However, in an existing simulation, the power inductor is modeled by an ideal RLGC (resistance R, inductance L, conductance G, capacitance C) device, and DC superimposition characteristics have not been taken into consideration.

Hence, when design is performed using simulation taking into consideration the requirements regarding a ripple voltage or an over-current limit, a power inductor had to be selected that allows DC superimposition characteristics to be ignored within the operation range of a DC-DC converter. As a result, an unnecessarily large margin has been required depending on the case.

The present invention has been made to solve the above-described problems. Accordingly it is an object of the present invention to provide a power inductor evaluation apparatus and a power inductor evaluation program that allow optimum selection and design of a power inductor without setting an unnecessarily large margin in designing a DC-DC converter.

According to preferred embodiments of the present invention, a power inductor evaluation apparatus includes: a storage unit storing a circuit model that includes an equivalent circuit model of a power inductor and simulates a DC-DC converter, the equivalent circuit model including a DC superimposition characteristics slope and a saturation current as parameters; a reception unit receiving input of the DC superimposition characteristics slope and the saturation current of the power inductor to be a determination object and input of a requirement including at least one of a permissible ripple voltage and a peak current; and a determination unit that performs an arithmetic operation by inputting the DC superimposition characteristics slope and saturation current received by the reception unit into the circuit model of the DC-DC converter including the equivalent circuit model of the power inductor and determines whether or not the power inductor having the DC superimposition characteristics slope and saturation current is usable on a basis of whether or not a result of the arithmetic operation satisfies the requirement.

When the slope of the DC superimposition characteristics is large, magnetic saturation is immediately generated when the saturation current Isat is exceeded and, hence, the inductance rapidly decreases. On the other hand, when the slope of the DC superimposition characteristics is small, a decrease in inductance is gradual even when the saturation current is exceeded and, hence, a flow-through phenomenon is unlikely to be generated. Here, according to the power inductor evaluation apparatus of preferred embodiments of the present invention, it can be determined whether or not desired requirements are satisfied taking into consideration the slope of the DC superimposition characteristics of a power inductor, that is, whether or not the power inductor (the DC superimposition characteristics slope and saturation current) can be used. Hence, in designing a DC-DC converter, an unnecessarily large margin need not be set and the selection or design of a power inductor can be optimized. As a result, for example, a small-size power inductor or a low-cost power inductor which was determined to be unusable becomes capable of being used.

In the power inductor evaluation apparatus according to preferred embodiments of the present invention, preferably, the power inductor is one of a plurality of power inductors and the storage unit stores, for each of the plurality of power inductors, the DC superimposition characteristics slope and the saturation current in association with a corresponding power inductor, the reception unit receives, instead of the DC superimposition characteristics slope and saturation current of the power inductor to be a determination object, input of information identifying the power inductor, and the determination unit acquires the DC superimposition characteristics slope and the saturation current corresponding to the received information identifying the power inductor from the storage unit, and determines whether or not the power inductor is usable.

With this configuration, by inputting information (for example, a part number) identifying the power inductor to be evaluated, it can be determined whether or not the power inductor is usable. As a result, it can be determined whether or not the power inductor is usable without inputting the DC superimposition characteristics slope and saturation current of the received power inductor and, hence, easier user operation can be realized.

In the power inductor evaluation apparatus according to preferred embodiments of the present invention, preferably, the equivalent circuit model of the power inductor approximates the DC superimposition characteristics slope by using a Fermi distribution function.

As a result of this configuration, a non-linear DC superimposition characteristics slope can be more appropriately approximated (represented).

Preferably, the power inductor evaluation apparatus according to preferred embodiments of the present invention further includes an acquisition unit that integrates results of usable/unusable determination performed regarding combinations of a plurality of DC superimposition characteristics slopes and respective saturation currents, and acquires a list of the combinations of DC superimposition characteristics slopes and respective saturation currents determined to be usable.

In this case, a list of the combinations of the DC superimposition characteristics slopes and the saturation currents that have been determined to be usable is acquired and, hence, a user (for example, the designer of a DC-DC converter) can easily select a more appropriate power inductor in designing a DC-DC converter.

According to preferred embodiments of the present invention, a power inductor evaluation apparatus includes: a storage unit storing a circuit model that includes an equivalent circuit model of a power inductor and simulates a DC-DC converter, the equivalent circuit model including measured DC superimposition characteristics data as a parameter; a reception unit receiving input of the measured DC superimposition characteristics data of the power inductor to be a determination object component, an operation condition of the DC-DC converter, and a requirement including at least one of a permissible ripple voltage and a peak current; and a determination unit that performs an arithmetic operation by inputting the measured DC superimposition characteristics data received by the reception unit into the circuit model of the DC-DC converter including the equivalent circuit model of the power inductor and determines whether or not the power inductor is usable on a basis of whether or not a result of the arithmetic operation satisfies the requirement in the operation condition.

According to a power inductor evaluation apparatus according to preferred embodiments of the present invention, it can be determined whether or not desired design requirements can be satisfied under a predetermined operation condition (specifications) by using the measured DC superimposition characteristics data of the power inductor to be a determination object, that is, it can be determined whether or not the power inductor can be used taking into consideration the DC superimposition characteristics slope of the power inductor. Hence, in designing a DC-DC converter, an unnecessarily large margin need not be set and the selection of a power inductor and the design can be optimized. As a result, it becomes possible to use, for example, a small-size power inductor or a low-cost power inductor which was determined to be unusable according to existing methods.

In the power inductor evaluation apparatus according to preferred embodiments of the present invention, preferably, the power inductor is one of a plurality of power inductors and the storage unit stores, for each of the plurality of power inductors, the measured DC superimposition characteristics data in association with a corresponding power inductor, the reception unit receives, instead of the measured DC superimposition characteristics data of the power inductor to be a determination object, input of information identifying the power inductor, and the determination unit acquires the measured DC superimposition characteristics data corresponding to the received information identifying the power inductor from the storage unit, and determines whether or not the power inductor is usable.

With this configuration, by inputting information (for example, a part number) identifying the power inductor to be evaluated, it can be determined whether or not the power inductor is usable. As a result it can be determined whether or not the power inductor is usable without inputting the measured DC superimposition characteristics data of the power inductor, enabling easier user operation.

Preferably, the power inductor evaluation apparatus according to preferred embodiments of the present invention further includes an acquisition unit that integrates a plurality of results of usable/unusable determination performed by changing an operation condition of the DC-DC converter, and acquires a range of operation conditions of a DC-DC converter determined to be usable.

In this case, the range of the operation conditions of a DC-DC converter determined to be usable is acquired and, hence, a user (for example, the designer of a DC-DC converter) can easily select a more appropriate power inductor in designing a DC-DC converter.

At this time, in the power inductor evaluation apparatus according to preferred embodiments of the present invention, preferably, the operation conditions of a DC-DC converter include at least one of an input voltage, an output voltage, an operating frequency, and an output current.

In this case, a usable range of an input voltage, an output voltage, an operating frequency, or an output current can be acquired. Hence, a user (for example, the designer of a DC-DC converter) can easily select a more appropriate power inductor in designing a DC-DC converter.

A power inductor evaluation program according to preferred embodiments of the present invention causes a computer to function as any one of the power inductor evaluation apparatuses described above.

As a result of the power inductor evaluation program according to preferred embodiments of the present invention being executed by a computer, the computer functions as a power inductor evaluation apparatus (in other words, the storage unit, the reception unit, the determination unit, and the acquisition unit). Hence, as described above, in designing a DC-DC converter, an unnecessarily large margin need not be set, and the selection of a power inductor and the design can be optimized.

Other features, elements, characteristics and advantages of the present invention will become more apparent from the following detailed description of preferred embodiments of the present invention with reference to the attached drawings.

DETAILED DESCRIPTION

Hereinafter, preferred embodiments of the present invention will be described in detail with reference to the drawings. Note that identical portions or corresponding portions in the figures are denoted by the same symbols. In the figures, identical components are denoted by the same symbols and duplicate descriptions thereof will be omitted.

First Embodiment

Figure 1:
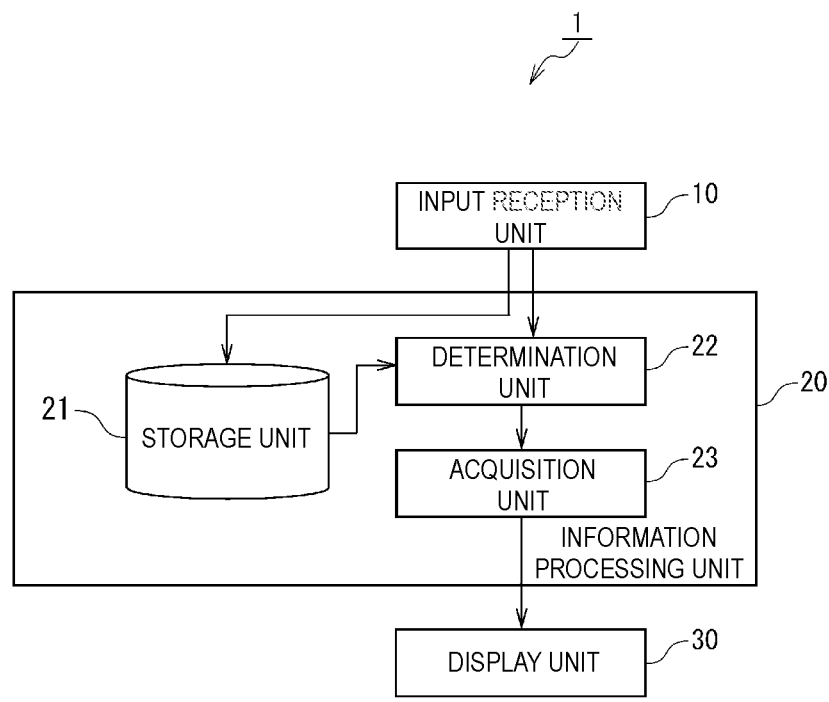
FIG. 1 is a block diagram illustrating the configuration of a power inductor evaluation apparatus according to a first embodiment.
Figure 2:
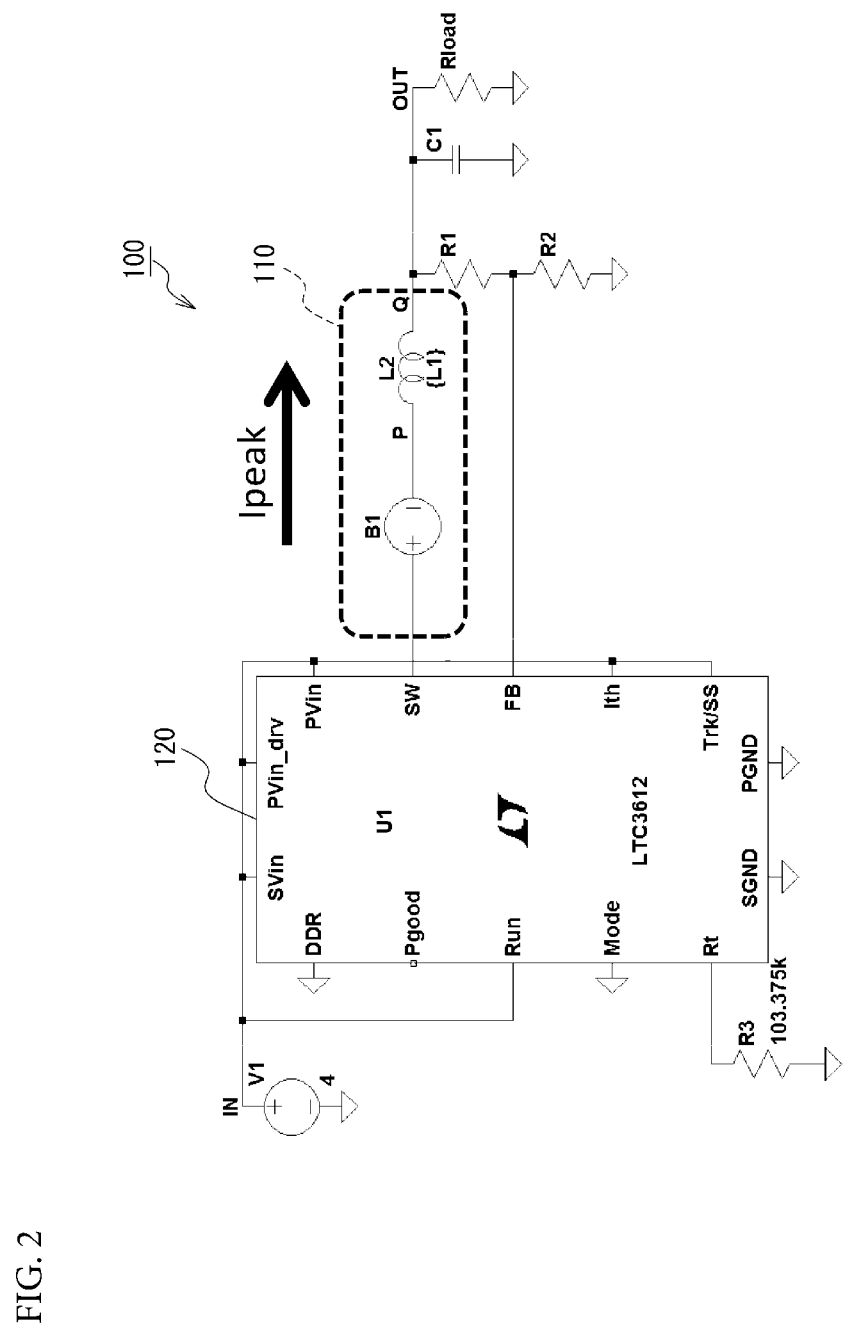
FIG. 2 is a diagram illustrating an example of a circuit model of a DC-DC converter to which an equivalent circuit model of a power inductor used in the power inductor evaluation apparatus according to the first embodiment is applied.

First, referring to FIG. 1, the configuration of a power inductor evaluation apparatus 1 according to a first embodiment will be described. FIG. 1 is a block diagram illustrating the configuration of the power inductor evaluation apparatus 1. FIG. 2 is a diagram illustrating an example of a circuit model (simulation model) of a DC-DC converter to which an equivalent circuit model of a power inductor used in the power inductor evaluation apparatus 1 is applied.

The power inductor evaluation apparatus 1 is an apparatus supporting the selection of a power inductor or the optimization of design in designing a DC-DC converter. For this purpose, the power inductor evaluation apparatus 1 includes an input reception unit 10, an information processing unit 20, and a display unit 30. The information processing unit 20 includes a storage unit 21, a determination unit 22, and an acquisition unit 23.

The input reception unit 10 is formed of, for example, a keyboard, a touch panel, and/or a pointing device, as well as an external input interface or the like for receiving data input from the outside. The input reception unit 10 receives input of the DC superimposition characteristics slope α (slope with which inductance decreases in accordance with a DC current flowing through a power inductor) and a saturation current Isat (DC current at the time when the inductance is reduced by a predetermined percentage (for example, 30%) compared with the time at which a DC current is not flowing) of a power inductor which is a determination object. Note that, as described later, when information (for example, a part number) identifying a power inductor, which is to be a determination object, is stored in correspondence with the DC superimposition characteristics slope α and the saturation current Isat of the power inductor, the input reception unit 10 receives input of information (for example, a part number) identifying a power inductor, which is to be a determination object, instead of the DC superimposition characteristics slope α and the saturation current Isat. Further, the input reception unit 10 receives input of design requirements including a permissible ripple voltage and a peak current. In other words, the input reception unit 10 functions as the reception unit of the present invention.

Note that when an equivalent circuit model 110 of a power inductor described later and a circuit model 100 of a DC-DC converter including the equivalent circuit model 110 are created, or these models created elsewhere are ported and stored, the input reception unit 10 receives a request for a model creation operation or a model porting operation. Various types of information received by the input reception unit 10 are output to the information processing unit 20.

The information processing unit 20 performs simulation by inputting the DC superimposition characteristics slope α and the saturation current Isat of a power inductor input through the input reception unit 10 into the previously stored circuit model 100 of a DC-DC converter including the equivalent circuit model 110 of the power inductor, and determines (evaluates), on the basis of whether or not the desired design requirements are satisfied, whether or not the combination of the DC superimposition characteristics slope α and the saturation current Isat (i.e., the power inductor) can be used.

The information processing unit 20 is formed of a microprocessor performing arithmetic processing, a ROM or a hard disk (HDD) for storing information such as a program for causing the microprocessor to execute various types of processing, a simulation model, and the like, a RAM for temporarily storing various types of data such as arithmetic results, a backup RAM whose stored content is maintained by a secondary battery or the like, input-output interfaces, and the like. In the information processing unit 20, the functions of the storage unit 21, the determination unit 22, and the acquisition unit 23 are realized as a result of programs stored in the ROM or the HDD being executed by the microprocessor.

The storage unit 21, which is formed of the ROM, HDD, and the like described above, stores the equivalent circuit model 110 of a power inductor including the DC superimposition characteristics slope α and the saturation current Isat, received by the input reception unit 10, as parameters and the circuit model (simulation model) 100 that includes the equivalent circuit model 110 of the power inductor and that simulates a DC-DC converter. In other words, the storage unit 21 functions as the storage unit of the present invention. Note that the storage unit 21 may store in advance, for each of a plurality of power inductors, the DC superimposition characteristics slope α and the saturation current Isat of the power inductor in association with the power inductor.

Here, the circuit model (simulation model) 100 of a DC-DC converter including the equivalent circuit model 110 of a power inductor is illustrated in FIG. 2. These models can be created by using, for example, LTspice provided by Linear Technology Corporation. However, instead of these models, for example, models created by other simulators or numerical solution methods based on mathematical equations may be used.

In the present embodiment, an IC model 120, LTC3612 provided by Linear Technology Corporation, which is a control IC, is used in combination with the equivalent circuit model 110 of a power inductor. The equivalent circuit model 110 of a power inductor has a configuration in which a voltage source model (current-controlled voltage source) which is a device converting the influence of L and R that change in accordance with a current into a voltage has been added to a basic circuit reflecting the characteristics corresponding to the case where a DC current is not superimposed, and the DC superimposition characteristics slope α and the saturation current Isat can be specified. Further, the DC superimposition characteristics slope α was approximated by a Fermi distribution function in the present embodiment. More specifically, α was determined so that the following Equation (1) matches the measured DC superimposition characteristics.

$$L(I) = \frac{L_1 - L_2}{\beta \exp\{\alpha(I - I_{sat})\}} + L_2 \quad (1)$$

Here, L1 is initial inductance, L2 is inductance after saturation, and Isat is a current (saturation current) when the inductance decreases by about 30%. Further, β can be obtained by the following Equation (2).

$$\beta = \frac{L_1 - L_2}{0.7 L_1 - L_2} - 1 \quad (2)$$

Figure 3:
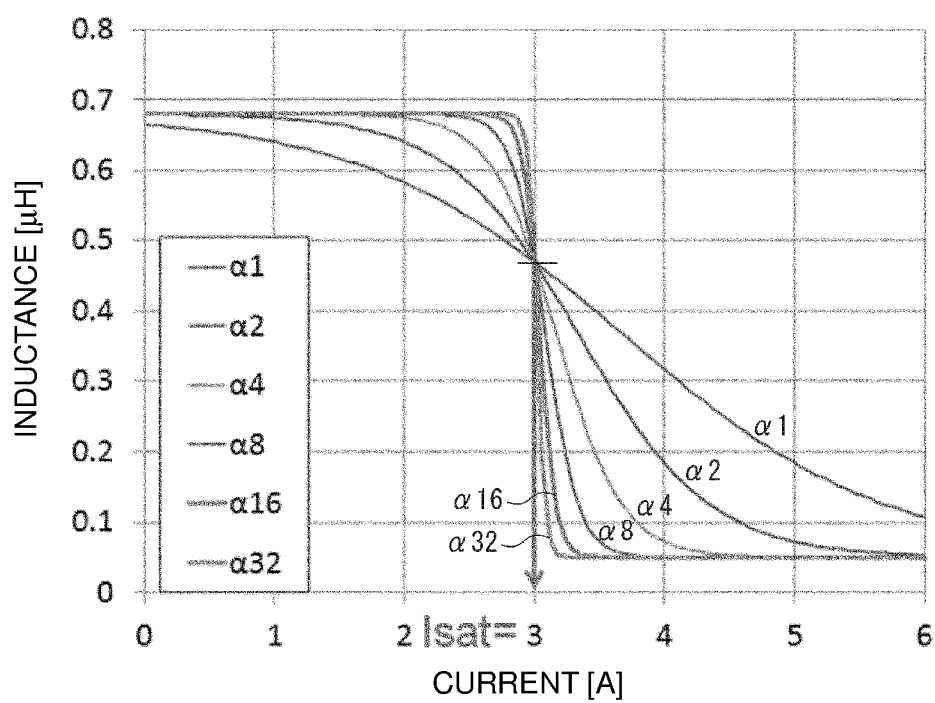
FIG. 3 is a diagram illustrating an example of the DC superimposition characteristics (slope) of a power inductor.

Here, examples of the DC superimposition characteristics (slopes α) of power inductors obtained as described above are illustrated in FIG. 3. The horizontal axis of FIG. 3 represents a DC current (A) flowing through a power inductor, and the vertical axis represents inductance (μH). In FIG. 3, six types of DC superimposition characteristics of power inductors having different slopes α (α1 to α32) are illustrated. In the examples illustrated in FIG. 3, respective power inductors have inductance corresponding to different slopes α that decrease with an increase in a flowing DC current, whereas the currents (the saturation currents Isat) corresponding to a decrease in inductance of 30% are the same (3A). Note that, here, in an existing evaluation method, it was determined whether or not the power inductor can be used only on the basis of the saturation current Isat without taking into consideration these differences in the slope α.

Referring back to FIG. 1, the determination unit 22 performs simulation (arithmetic operation) by making the DC superimposition characteristics slope α and the saturation current Isat be included in the circuit model 100 of a DC-DC converter including the equivalent circuit model 110 of a power inductor, and on the basis of whether or not the simulation (arithmetic operation) results satisfy desired design requirements (for example, a ripple voltage, a peak current, and the like), it is determined whether or not the combination of the DC superimposition characteristics slope α and the saturation current Isat (i.e., power inductor) can be used. In other words, the determination unit 22 functions as the determination unit of the present invention.

Note that when information (for example, a part number) identifying a power inductor, which is to be a determination object, is stored in correspondence with the DC superimposition characteristics slope α and the saturation current Isat of the power inductor, the determination unit 22 acquires the DC superimposition characteristics slope α and the saturation current Isat corresponding to the received information (for example, a part number) identifying the power inductor from the storage unit 21, and determines whether or not the combination of the DC superimposition characteristics slope α and the saturation current Isat (i.e, power inductor) can be used. Note that the determination result obtained by the determination unit 22 is output to the acquisition unit 23.

The acquisition unit 23 integrates (summarizes) the results of determination regarding whether or not a plurality of respective combinations of the DC superimposition characteristics slopes α and the saturation currents Isat can be used, and acquires a list (refer to Tables 2 and 3 described later) of usable combinations of the respective DC superimposition characteristics slopes α and the saturation currents Isat. In other words, the acquisition unit 23 functions as the acquisition unit of the present invention. Note that the determination results obtained by the determination unit 22 and the list acquired by the acquisition unit 23 are output to the display unit 30.

The display unit 30, which is formed of, for example, an LCD display, displays the determination results obtained by the determination unit 22, the list acquired by the acquisition unit 23, and the like. Further, the display unit 30 also displays input data received by the input reception unit 10, and the like.

Figure 4:
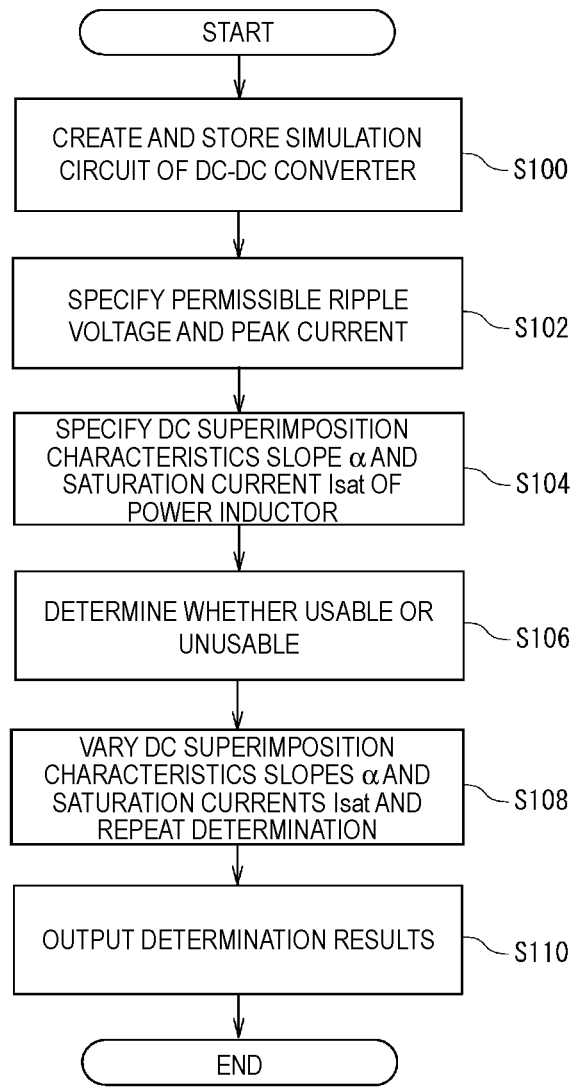
FIG. 4 is a flowchart illustrating the processing steps of power inductor evaluation processing (usable/unusable determination processing) performed by the power inductor evaluation apparatus according to the first embodiment.

Next, referring to FIG. 4, the operation of the power inductor evaluation apparatus 1 will be described. FIG. 4 is a flowchart illustrating the processing steps of power inductor evaluation processing (usable/unusable determination processing) performed by the power inductor evaluation apparatus 1.

In step S100, the equivalent circuit model 110 of a power inductor, and the circuit model 100 (an input voltage Vin, an output voltage Vout, an operating frequency Freq, an output current Iout) of a DC-DC converter including the equivalent circuit model 110 is created (or input from the outside) and stored.

Then, in step S102, a permissible ripple voltage, a peak current, and the like are input (specified). In step S104, the DC superimposition characteristics slope α and the saturation current Isat of a power inductor are input (specified).

Next, in step S106, the DC superimposition characteristics slope α and the saturation current Isat of the power inductor are input into the simulation circuit 100 of the DC-DC converter including the equivalent circuit model 110 of the power inductor, and simulation is performed. Then, it is determined whether or not the combination of the DC superimposition characteristics slope α and the saturation current Isat (i.e., power inductor) can be used, on the basis of whether or not the simulation (arithmetic operation) results satisfy the desired design requirements (a ripple voltage, a peak current, and the like).

Then in step S108, the DC superimposition characteristics slope α and saturation current Isat of a power inductor are varied, and similarly to step S106 described above, it is determined whether or not the respective combinations of the DC superimposition characteristics slopes α and the saturation currents Isat (i.e., power inductors) can be used.

Then, in step S110, the evaluation results (list of usable/unusable determination results for the respective combinations of the DC superimposition characteristics slopes α and the saturation currents Isat (refer to Tables 2 and 3)) and the like obtained in step S106 and step S108 are output and are displayed by the display unit 30. After this, the present processing ends.

Example

Here, it was determined whether or not a power inductor can be used for two types of DC-DC converter having the operation conditions (condition 1 and condition 2) illustrated in Table 1 by using the DC superimposition characteristics slope α and the saturation current Isat. Note that, in the determination, the simulation model 100 of a DC-DC converter illustrated in FIG. 2 was used. As the determination criterion, it was determined whether or not a peak current Ipeak in a power inductor reaches a limit current (see Table 1) at which the DC-DC converter stops operation.

TABLE 1

|  | Condition 1 | Condition 2 |
| --- | --- | --- |
| Frequency | 3.2 MHz | 1.6 MHz |
| Input-output voltage | 4/2.0 V | 4/2.0 V |
| Inductance | 1.0 μH | 2.2 μH |
| Output current | 2 A | 1.5 A |
| Limit current | 3.1 A | 2.4 A |

Figure 5:
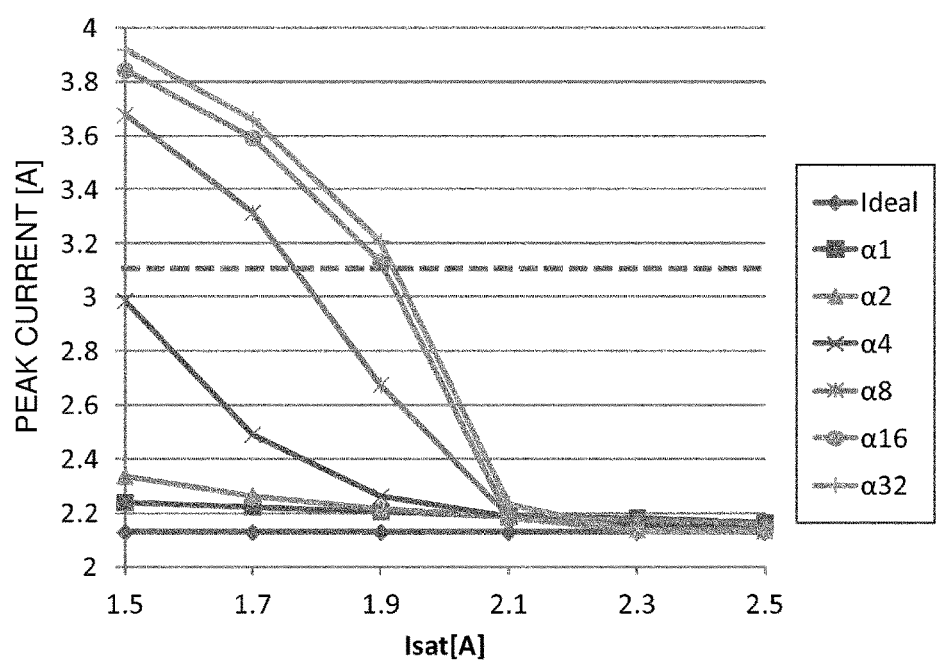
FIG. 5 is a diagram illustrating the simulation results (peak currents Ipeak) of an embodiment (condition 1).

For condition 1, FIG. 5 illustrates the simulation results of the peak current Ipeak in a power inductor when the saturation current Isat of the power inductor was changed from 1.5 A to 2.5 A with 2 A as the center, which is the maximum output current, and the DC superimposition characteristics slope α was changed from 1 to 32. Further, Table 2 is a list illustrating whether power inductors are usable or unusable for each of the DC superimposition characteristics slopes α.

In FIG. 5, the horizontal axis represents the saturation current Isat (A) and the vertical axis represents the peak current Ipeak (A). As illustrated in FIG. 5, it was confirmed that, when the DC superimposition characteristics slope α is less than or equal to 2, the corresponding power inductors can be used without an error even when the saturation current Isat becomes less than the maximum current by 500 mA. Further, it was confirmed that the saturation current Isat allowing the usage of a corresponding power inductor changes in accordance with the slope α.

In other words, as illustrated in Table 2, it was confirmed that, when the slope α is 8, the corresponding power inductor can be used even when the saturation current Isat is 1.9 A. Further, it was confirmed that in the case where the slope α is 1, 2, or 4, the corresponding power inductor can be used even when the saturation current Isat is 1.5 A. Note that in the existing method in which the slope α is not taken into consideration, it was determined that every power inductor having a saturation current Isat of 2.1 A or less is unusable.

TABLE 2

|  | Isat | | | | | |
| --- | --- | --- | --- | --- | --- | --- |
| α | 1.5 | 1.7 | 1.9 | 2.1 | 2.3 | 2.5 |
| 1 | O | O | O | O | O | O |
| 2 | O | O | O | O | O | O |
| 4 | O | O | O | O | O | O |
| 8 | X | X | O | O | O | O |
| 16 | X | X | X | O | O | O |
| 32 | X | X | X | O | O | O |

O: Usable
X: Unusable

Figure 6:
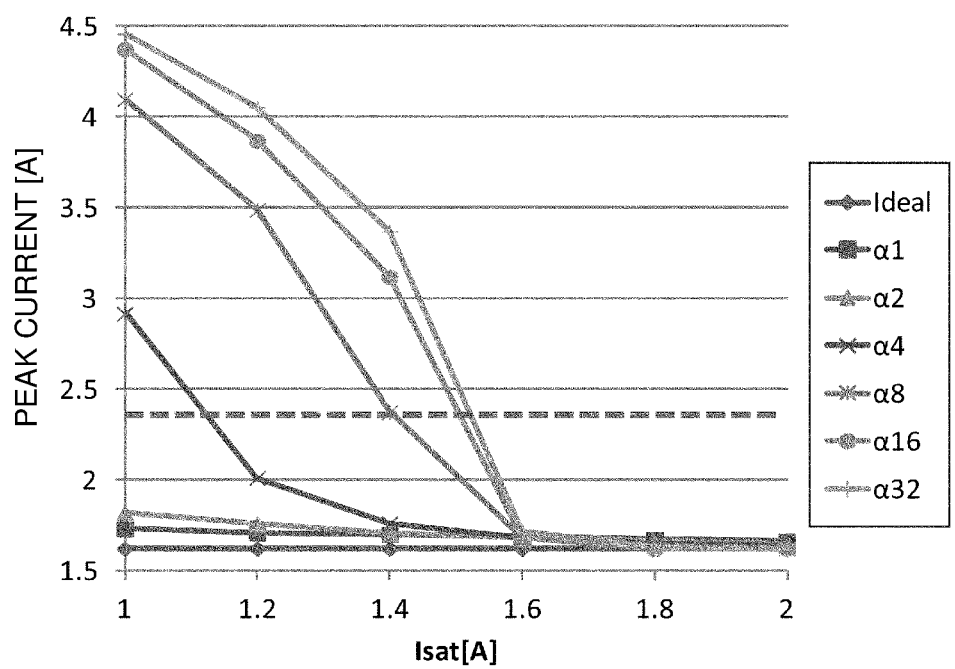
FIG. 6 is a diagram illustrating the simulation results (peak currents Ipeak) of an embodiment (condition 2).

Similarly, for condition 2, FIG. 6 illustrates the simulation results of the peak current Ipeak in a power inductor when the saturation current Isat of the power inductor was changed from 1.0 A to 2.0 A with 1.5 A as the center, which is the maximum output current, and the DC superimposition characteristics slope α was changed from 1 to 32. Further, Table 3 is a list illustrating whether power inductors are usable or unusable for each of the DC superimposition characteristics slopes α.

In FIG. 6, the horizontal axis represents the saturation current Isat (A) and the vertical axis represents the peak current Ipeak (A). As illustrated in FIG. 6, it was confirmed that, when the DC superimposition characteristics slope α is less than or equal to 2, the corresponding power inductors can be used without an error even when the saturation current Isat becomes less than the maximum current by 500 mA. Further, it was confirmed that the saturation current Isat allowing the usage of a corresponding power inductor changes in accordance with the slope α.

In other words, as illustrated in Table 3, it was confirmed that, when the slope α is 4, the corresponding power inductor can be used even when the saturation current Isat is 1.2 A. Further, it was confirmed that in the case where the slope α is 1 or 2, the corresponding power inductor can be used even when the saturation current Isat is 1.0 A. Note that in the existing method in which the slope α is not taken into consideration, it was determined that every power inductor having the saturation current Isat of 1.4 A or less is unusable.

TABLE 3

|  | Isat | | | | | |
| --- | --- | --- | --- | --- | --- | --- |
| α | 1 | 1.2 | 1.4 | 1.6 | 1.8 | 2.0 |
| 1 | O | O | O | O | O | O |
| 2 | O | O | O | O | O | O |
| 4 | X | O | O | O | O | O |
| 8 | X | X | X | O | O | O |
| 16 | X | X | X | O | O | O |
| 32 | X | X | X | O | O | O |

O: Usable
X: Unusable

As described above in detail, according to the present embodiment, it can be determined whether or not desired design requirements are satisfied, i.e., whether or not the power inductor can be used, taking into consideration the DC superimposition characteristics slope α of the power inductor. Hence, in designing a DC-DC converter, an unnecessarily large margin need not be set and a more appropriate power inductor can be chosen. As a result, it becomes possible to use, for example, a small-size power inductor or a low-cost power inductor which was determined to be unusable according to existing methods.

Further, according to the present embodiment, through input of information (for example, a part number or the like) identifying a power inductor to be evaluated, it can be determined whether or not the power inductor can be used. Hence, it becomes possible to determine whether or not a power inductor can be used without inputting the DC superimposition characteristics slope α or saturation current Isat of the power inductor, enabling easier user operation.

According to the present embodiment, since the DC superimposition characteristics slope α of a power inductor is approximated by a Fermi distribution function, the DC superimposition characteristics slope α which is nonlinear can be more appropriately approximated (represented).

According to the present embodiment, a list of the combinations of the DC superimposition characteristics slopes α and the saturation currents Isat that have been determined to be usable is acquired and, hence, a user (for example, the designer of a DC-DC converter) can easily select a more appropriate power inductor in designing a DC-DC converter.

Second Embodiment

In the power inductor evaluation apparatus 1 according to the first embodiment described above, the DC superimposition characteristics slope α and the saturation current Isat are input into the circuit model 100 of a DC-DC converter. However, a configuration may be employed in which measured DC superimposition characteristics are input. Further, in the power inductor evaluation apparatus 1 described above, it is determined whether or not the combinations of the DC superimposition characteristics slopes α and the saturation currents Isat are usable, and the result was output. However, a configuration may be employed in which the range of usable operation conditions (for example, the output current Iout) of a DC-DC converter for the measured DC superimposition characteristics (power inductor) is determined and output.

Figure 7:
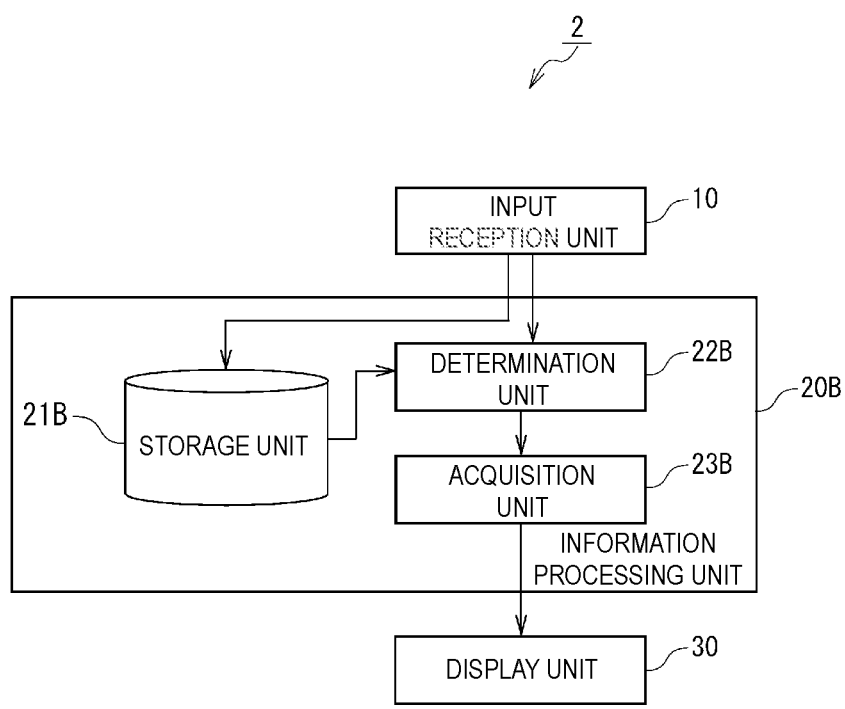
FIG. 7 is a block diagram illustrating the configuration of a power inductor evaluation apparatus according to a second embodiment.
Figure 8:
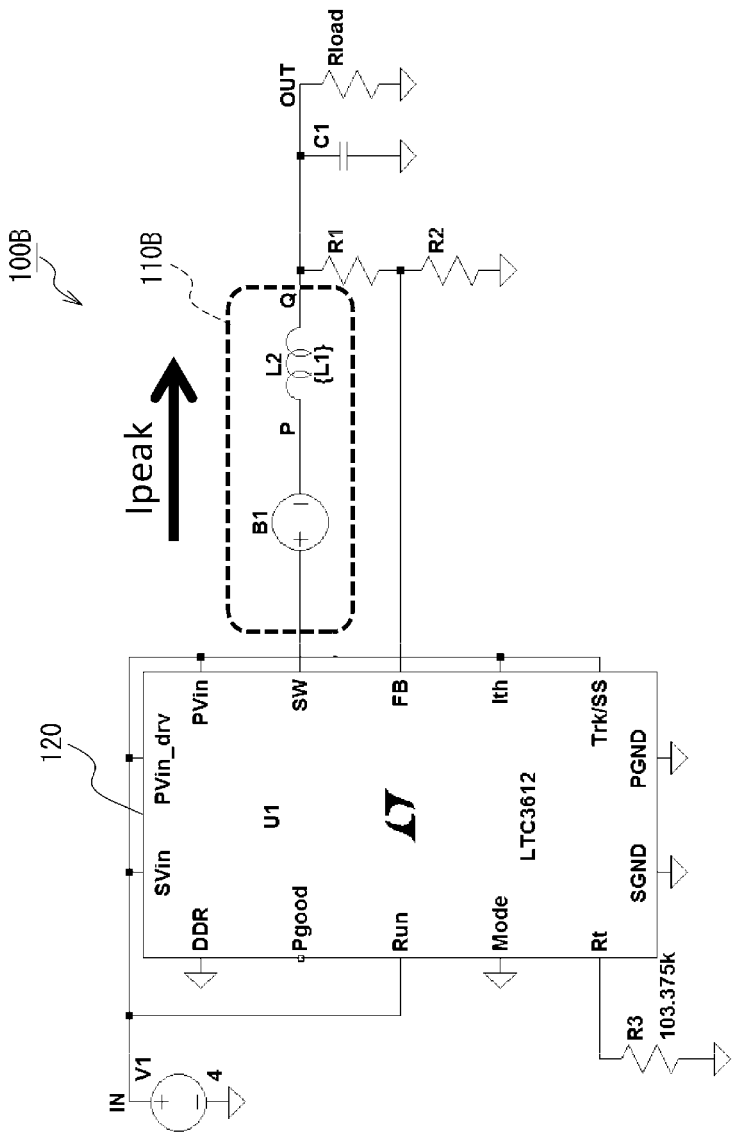
FIG. 8 is a diagram illustrating an example of the circuit model of a DC-DC converter to which the equivalent circuit model of a power inductor used in the power inductor evaluation apparatus according to the second embodiment is applied.

Hence, hereinafter, a power inductor evaluation apparatus 2 according to a second embodiment is described with reference to both FIGS. 7 and 8. Here, the description of configurations which are identical or similar to those of the power inductor evaluation apparatus 1 according to the first embodiment described above will be simplified or omitted, and different points will mainly be described. FIG. 7 is a block diagram illustrating the configuration of the power inductor evaluation apparatus 2 according to the second embodiment. FIG. 8 is a diagram illustrating an example of the circuit model of a DC-DC converter to which the equivalent circuit model of a power inductor used in the power inductor evaluation apparatus 2 is applied. Note that in FIGS. 7 and 8, configuration components which are identical or similar to those of the first embodiment are denoted by identical symbols.

The power inductor evaluation apparatus 2 includes an information processing unit 20B instead of the information processing unit 20, unlike the power inductor evaluation apparatus 1 described above. Further, the information processing unit 20B includes a storage unit 21B instead of the storage unit 21, includes a determination unit 22B instead of the determination unit 22, and includes an acquisition unit 23B instead of the acquisition unit 23, unlike the information processing unit 20. The rest of the configuration is identical or similar to that of the power inductor evaluation apparatus 1 described above and, hence, the detailed description thereof is omitted here.

The input reception unit 10 receives the measured DC superimposition characteristics data of a power inductor, which is to be a determination object component. Note that when information (for example, a part number) identifying the power inductor which is to be a determination object is stored in correspondence with the measured DC superimposition characteristics data of the power inductor, the input reception unit 10 receives input of information (for example, a part number) identifying the power inductor which is to be a determination object instead of the measured data. Further, the input reception unit 10 receives input of the operation conditions of a DC-DC converter and design requirements, such as a permissible ripple voltage and a peak current.

The information processing unit 20B performs simulation (arithmetic operation) by inputting the measured DC superimposition characteristics data of a power inductor into a circuit model 100B of a DC-DC converter including an equivalent circuit model 110B of a power inductor stored in advance, and determines (evaluates) whether or not the power inductor can be used on the basis of whether or not the desired design requirements are satisfied under a predetermined operation condition of the DC-DC converter. Further, by varying the operation condition of the DC-DC converter and performing a similar determination, the information processing unit 20B obtains, for a power inductor as an object, a list of DC-DC converters in which the ripple of the power inductor current and the peak current in the power inductor satisfy desired specifications.

The storage unit 21B stores the measured DC superimposition characteristics data received by the input reception unit 10 and a circuit model (simulation model) 100B that includes the equivalent circuit model 110B of a power inductor allowing the measured DC superimposition characteristics data to be set as a parameter and that simulates a DC-DC converter. Note that the storage unit 21B may store in advance, for each of a plurality of power inductors, a power inductor and the corresponding measured DC superimposition characteristics data of the power inductor associated with each other.

Here, FIG. 8 illustrates the circuit model (simulation model) 100B of a DC-DC converter including the equivalent circuit model 110B of a power inductor. The circuit model 100B of the DC-DC converter is a circuit model obtained by adding to the circuit model 100 described above a function capable of handling the measured DC superimposition characteristics data. Note that the circuit model 100B of a DC-DC converter is, for example, configured to allow operation conditions of the DC-DC converter, such as the input voltage Vin, the output voltage Vout, the operating frequency Freq, the output current Iout, and the like to be treated as variables. However, instead of these models, models created by other simulators, numerical analysis based on mathematical equations, or the like may be used.

The determination unit 22B performs simulation (arithmetic operation) by inputting the measured DC superimposition characteristics data into the circuit model 100B of a DC-DC converter including the equivalent circuit model 110B of the power inductor and determines whether or not the power inductor (determination object component) can be used on the basis of whether or not the simulation (arithmetic operation) result satisfies predetermined design requirements (for example, a permissible ripple voltage, a peak current, and the like) under a predetermined operation condition (for example, the output current Iout) of the DC-DC converter.

Note that when information (for example, a part number) identifying the power inductor to be a determination object is stored in correspondence with the measured DC superimposition characteristics data of the power inductor, the determination unit 22B acquires the measured DC superimposition characteristics data corresponding to the received information (for example, a part number) identifying the power inductor from the storage unit 21B, and determines whether or not the measured DC superimposition characteristics data (power inductor) can be used. Note that the determination result obtained by the determination unit 22B is output to the acquisition unit 23B.

The acquisition unit 23B integrates (summarizes) a plurality of the results of usable/unusable determination performed by changing the operation condition of the DC-DC converter, and acquires the range of the operation conditions of the DC-DC converter that were determined to be usable (refer to Table 6 described below). Note that the determination results obtained by the determination unit 22B and the list acquired by the acquisition unit 23B are output to the display unit 30.

Figure 9:
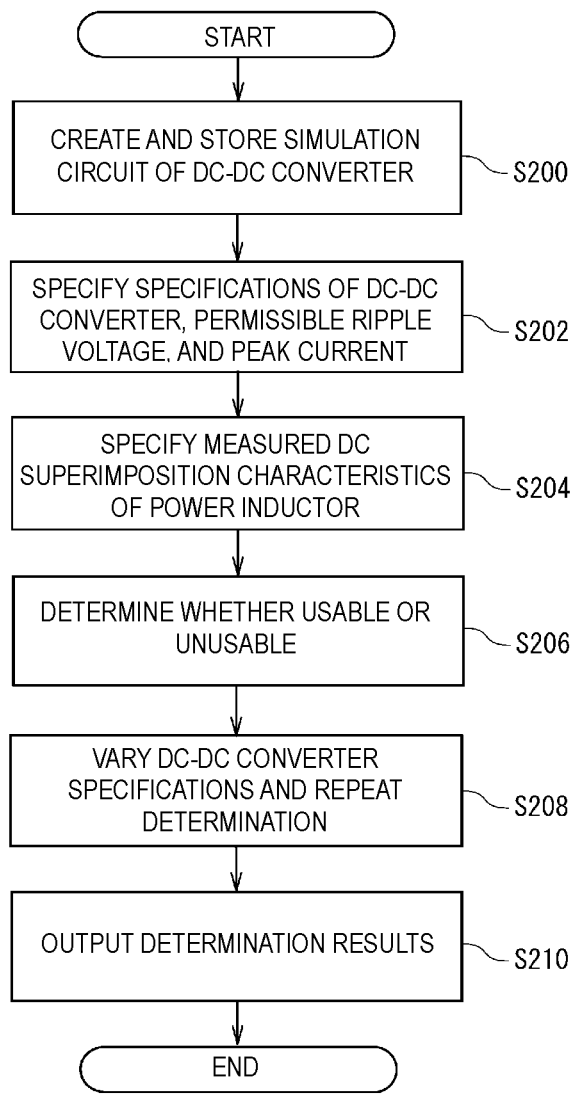
FIG. 9 is a flowchart illustrating the processing steps of power inductor evaluation processing (usable/unusable determination processing) performed by the power inductor evaluation apparatus according to the second embodiment.

Next, referring to FIG. 9, the operation of the power inductor evaluation apparatus 2 will be described. FIG. 9 is a flowchart illustrating the processing steps of power inductor evaluation processing (usable/unusable determination processing) performed by the power inductor evaluation apparatus 2.

In step S200, the equivalent circuit model 110B of a power inductor, and the simulation circuit 100B (an input voltage Vin, an output voltage Vout, an operating frequency Freq, an output current Iout) of a DC-DC converter including the equivalent circuit model 110B is created (or input from the outside) and stored.

Then, in step S202, the operation condition of the DC-DC converter (for example, the output current Iout) and design requirements such as a permissible ripple voltage, a peak current, and the like are input (specified). In step S204, the measured DC superimposition characteristics data of the power inductor is input (specified).

Next, in step S206, the measured DC superimposition characteristics data of the power inductor is input into the simulation circuit 100B of a DC-DC converter including the equivalent circuit of the power inductor, and simulation (arithmetic operation) is performed. Then, it is determined whether or not the measured DC superimposition characteristics data (power inductor) can be used, on the basis of whether or not the simulation (arithmetic operation) results satisfy desired design requirements (a ripple voltage, a peak current, and the like) under a predetermined operation condition (for example, the output current Iout).

Then in step S208, the operation condition of the DC-DC converter is varied, and similarly to step S206 described above, it is determined whether or not the pieces of the measured DC superimposition characteristics data (power inductors) can be used.

Then in step S210, the evaluation results (the range of the operation conditions of the DC-DC converter under which the power inductor can be used (refer to Table 6)) and the like obtained in step S206 and step S208 are output and displayed by the display unit 30. Then, the present processing ends.

Example

Here, as illustrated in Table 4, for six types of power inductor (samples 1 to 6) having different sizes, saturation currents Isat, and DC superimposition characteristics slopes α, and for the specifications (conditions) of DC-DC converters illustrated in Table 5, the range of the output current Iout that can satisfy the limit current (set to the output current+A) condition was computed. Note that the simulation model 100B of a DC-DC converter illustrated in FIG. 8 was used for determination.

TABLE 4

| | Size | L [μH] | Isat [A] | Slope α |
|---|---|---|---|---|
| Sample 1 | 2016 | 1 | 1.5 | 2 |
| Sample 2 | 2016 | 1 | 1.5 | 20 |
| Sample 3 | 2520 | 1 | 2 | 2 |
| Sample 4 | 2520 | 1 | 2 | 20 |
| Sample 5 | 3216 | 1 | 2.5 | 2 |
| Sample 6 | 3216 | 1 | 2.5 | 20 |

TABLE 5

| | Condition 1 |
|---|---|
| Frequency | 3.2 MHz |
| Input voltage | 4/2.0 V |
| Inductance | 1.0 μH |
| Output current Iout | Variable |
| Limit current | Output current + 1 A |

Table 6 illustrates the results of the output currents Iout that do not exceed the limit current, computed by simulation. As illustrated in Table 6, it was confirmed that the sample 1 (Isat: 1.5 A, α2) having a small slope α can be used up to 2.25 A according to the evaluation of the present embodiment, although the sample 1 was usable only up to 1.5 A according to existing evaluation. Similarly, it was confirmed that the sample 3 (Isat: 2 A, α2) can be used up to 2.75 A according to the evaluation of the present embodiment, although the sample 3 was usable only up to 2 A according to the existing evaluation. Similarly, it was confirmed that the sample 5 (Isat: 2.5 A, α2) can be used up to 3.0 A according to the evaluation of the present embodiment, although the sample 5 was usable only up to 2.5 A according to the existing evaluation. Note that it was confirmed that the samples 2, 4, and 6 having large slopes α can be used only in respective ranges which are the same as those determined by the existing evaluation.

TABLE 6

| | Iout (A) | | | | | | |
|---|---|---|---|---|---|---|---|
| Sample | 1.5 | 1.75 | 2.0 | 2.25 | 2.5 | 2.75 | 3.0 |
| 1 (Isat: 1.5 A, α2) | ○ | ○ | ○ | ○ | X | X | X |
| 2 (Isat: 1.5 A, α20) | ○ | X | X | X | X | X | X |
| 3 (Isat: 2 A, α2) | ○ | ○ | ○ | ○ | ○ | ○ | X |
| 4 (Isat: 2 A, α20) | ○ | ○ | ○ | X | X | X | X |
| 5 (Isat: 2.5 A, α2) | ○ | ○ | ○ | ○ | ○ | ○ | ○ |
| 6 (Isat: 2.5 A, α20) | ○ | ○ | ○ | ○ | ○ | X | X |

○: usable
X: unusable

As described above, according to the present embodiment, it can be determined whether or not desired design requirements can be satisfied under predetermined operation conditions (specifications) by using the measured DC superimposition characteristics data of a power inductor which is to be a determination object, that is, it can be determined whether or not the power inductor can be used taking into consideration the DC superimposition characteristics slope of the power inductor. Hence, in designing a DC-DC converter, an unnecessarily large margin need not be set and a more appropriate power inductor can be chosen. As a result, it becomes possible to use, for example, a small-size power inductor or a low-cost power inductor which was determined to be unusable according existing methods.

Further, according to the present embodiment, through input of information (for example, a part number or the like) identifying a power inductor to be evaluated, it can be determined whether or not the power inductor can be used. Hence, in this case, it becomes possible to determine whether or not a power inductor can be used without inputting the measured DC superimposition characteristics data of the power inductor, enabling easier user operation.

In particular, according to the present embodiment, the range of the operation conditions (specifications) of a DC-DC converter determined to be usable is acquired and, hence, a user (for example, the designer of a DC-DC converter) can easily select a more appropriate power inductor in designing a DC-DC converter.

Figure 10:
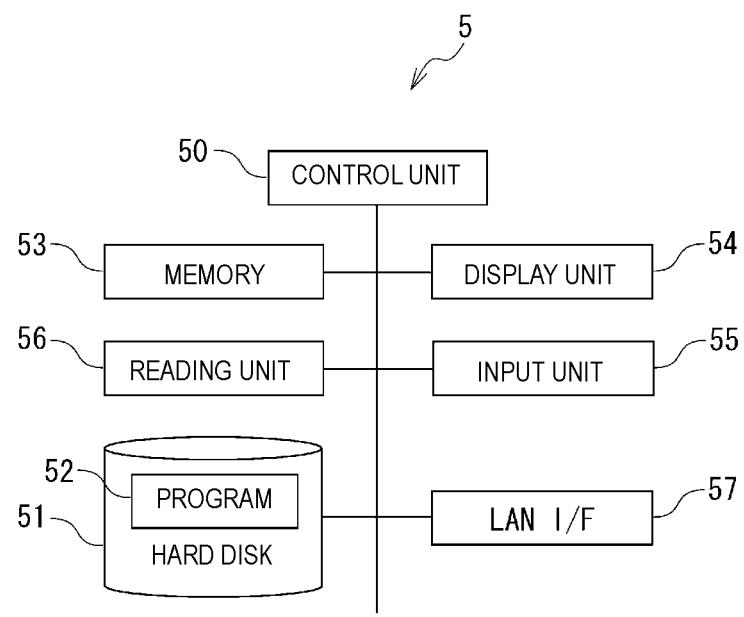
FIG. 10 is a block diagram illustrating the configuration of a computer for executing a power inductor evaluation program.

Next, referring to FIG. 10, a power inductor evaluation program that causes a computer to function as the power inductor evaluation apparatus 1 (or 2) described above will be described. FIG. 10 is a block diagram illustrating the configuration of a computer 5 for executing the power inductor evaluation program.

The computer 5 includes a control unit (CPU) 50 for controlling the execution of a power inductor evaluation program 52, a hard disk 51 storing the power inductor evaluation program 52 and the like, a memory (RAM) 53, a display unit 54 formed of a display or the like, an input unit 55 formed of a keyboard or the like, a reading unit 56 that can read programs and the like recorded on a recording medium such as a CD-ROM, and a LAN interface 57 formed of a LAN board. Here, for example, as a result of the power inductor evaluation program 52 stored (installed) in the hard disk 51 read by the reading unit 56 being executed, the computer 5 functions as the input reception unit 10, the storage unit 21 (21B), the determination unit 22 (22B), the acquisition unit 23 (23B), and the display unit 30, which form the power inductor evaluation apparatus 1 (2) described above.

According to the present embodiment, as a result of the power inductor evaluation program 52 being executed, the computer 5 functions as the power inductor evaluation apparatus (in other words, the input reception unit 10, the storage unit 21, the determination unit 22, and the acquisition unit 23). As a result, as described above, in designing a DC-DC converter, a margin which is unnecessarily large need not be set and, hence, selection of a power inductor and design can be optimized.

The embodiments of the present invention have been described above. However, the present invention is not limited to the embodiments described above, and various modifications are possible. For example, although the DC superimposition characteristics slope $\alpha$ was approximated by using a Fermi distribution function in the embodiment described above, the method of approximating (method of representing) the slope $\alpha$ is not limited to the method of using a Fermi distribution function.

Further, in the second embodiment, although the usable operation range of a DC-DC converter was acquired by using measured DC superimposition characteristics data, a configuration may be employed in which the usable operation range of a DC-DC converter is acquired by using the DC superimposition characteristics slope $\alpha$ and the saturation current Isat.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A power inductor evaluation apparatus comprising:
a storage unit storing a circuit model that includes an equivalent circuit model of a power inductor and simulates a Direct Current to Direct Current (DC-DC) converter, the equivalent circuit model including a Direct Current (DC) superimposition characteristics slope and a saturation current as parameters;
a reception unit receiving input of the DC superimposition characteristics slope and the saturation current of the power inductor to be a determination object and input of a requirement including at least one of a permissible ripple voltage and a peak current; and
a determination unit that performs an arithmetic operation by inputting the DC superimposition characteristics slope and saturation current received by the reception unit into the circuit model of the DC-DC converter including the equivalent circuit model of the power inductor and determines whether or not the power inductor having the DC superimposition characteristics slope and saturation current is usable on a basis of whether or not a result of the arithmetic operation satisfies the requirement thus providing a basis for power inductor optimization based upon DC superimposition characteristics slope and/or saturation current margins.

2. The power inductor evaluation apparatus according to claim 1,
wherein the power inductor is one of a plurality of power inductors and the storage unit stores, for each of the plurality of power inductors, the DC superimposition characteristics slope and the saturation current in association with a corresponding power inductor,
wherein the reception unit receives, instead of the DC superimposition characteristics slope and saturation current of the power inductor to be a determination object, input of information identifying the power inductor, and
wherein the determination unit acquires the DC superimposition characteristics slope and the saturation current corresponding to the information identifying the power inductor from the storage unit, and determines whether or not the power inductor is usable.

3. The power inductor evaluation apparatus according to claim 1, wherein the equivalent circuit model of the power inductor approximates the DC superimposition characteristics slope by using a Fermi distribution function.

4. The power inductor evaluation apparatus according to claim 1, further comprising an acquisition unit that integrates results of usable/unusable determination performed regarding combinations of a plurality of DC superimposition characteristics slopes and respective saturation currents, and acquires a list of the combinations of DC superimposition characteristics slopes and respective saturation currents determined to be usable.

5. A power inductor evaluation program that resides in a non-transitory computer-readable storage medium and that causes a computer to function as the power inductor evaluation apparatus according to claim 1.

6. The power inductor evaluation apparatus according to claim 1, wherein the power inductor is one of a plurality of power inductors and the storage unit stores, for each of the plurality of power inductors, the DC superimposition characteristics slope and the saturation current in association with a corresponding power inductor, and the power inductor evaluation apparatus provides DC superimposition characteristics slope and saturation current margin criteria for selecting an optimal power inductor.

7. A power inductor evaluation apparatus comprising:
a storage unit storing a circuit model that includes an equivalent circuit model of a power inductor and simulates a Direct Current to Direct Current (DC-DC) converter, the equivalent circuit model including measured Direct Current (DC) superimposition characteristics data as a parameter;
a reception unit receiving input of the measured DC superimposition characteristics data of the power inductor to be a determination object component, an operation condition of the DC-DC converter, and a requirement including at least one of a permissible ripple voltage and a peak current; and
a determination unit that performs an arithmetic operation by inputting the measured DC superimposition characteristics data received by the reception unit into the circuit model of the DC-DC converter including the equivalent circuit model of the power inductor and determines whether or not the power inductor is usable on a basis of whether or not a result of the arithmetic operation satisfies the requirement in the operation condition thus providing a basis for power inductor optimization based upon DC superimposition characteristics slope and/or saturation current margins.

8. The power inductor evaluation apparatus according to claim 7,
wherein the power inductor is one of a plurality of power inductors and the storage unit stores, for each of the plurality of power inductors, the measured DC superimposition characteristics data in association with a corresponding power inductor,
wherein the reception unit receives, instead of the measured DC superimposition characteristics data of the power inductor to be a determination object, input of information identifying the power inductor, and
wherein the determination unit acquires the measured DC superimposition characteristics data corresponding to the received information identifying the power inductor from the storage unit, and determines whether or not the power inductor is usable.

9. The power inductor evaluation apparatus according to claim 7, further comprising an acquisition unit that integrates a plurality of results of usable/unusable determination performed by changing an operation condition of the DC-DC converter, and acquires a range of operation conditions of the DC-DC converter determined to be usable.

10. The power inductor evaluation apparatus according to claim 9, wherein the operation conditions of the DC-DC converter include at least one of an input voltage, an output voltage, an operating frequency, and an output current.

11. The power inductor evaluation apparatus according to claim 7, wherein the power inductor is one of a plurality of power inductors and the storage unit stores, for each of the plurality of power inductors, the DC superimposition characteristics slope and the saturation current in association with a corresponding power inductor, and the power inductor evaluation apparatus provides DC superimposition characteristics slope and saturation current margin criteria for selecting an optimal power inductor.

* * * * *